US012667964B2

(12) United States Patent
Yamazaki et al.

(10) Patent No.: US 12,667,964 B2
(45) Date of Patent: Jun. 30, 2026

(54) CONTROL SYSTEM, CONTROL METHOD, AND NON-TRANSITORY COMPUTER READABLE MEDIUM STORING CONTROL PROGRAM

(71) Applicant: TOYOTA JIDOSHA KABUSHIKI KAISHA, Toyota (JP)

(72) Inventors: Takahiro Yamazaki, Toyota (JP); Keisuke Takeshita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 18/970,132

(22) Filed: Dec. 5, 2024

(65) Prior Publication Data

US 2025/0187182 A1 Jun. 12, 2025

(30) Foreign Application Priority Data

Dec. 8, 2023 (JP) ................................. 2023-207410

(51) Int. Cl.
*B25J 9/00* (2006.01)
*B25J 9/16* (2006.01)
*B25J 5/00* (2006.01)

(52) U.S. Cl.
CPC ........... *B25J 9/1653* (2013.01); *B25J 9/1607* (2013.01); *B25J 9/162* (2013.01); *B25J 9/1664* (2013.01); *B25J 5/007* (2013.01)

(58) Field of Classification Search
CPC ........ B25J 9/1653; B25J 9/1607; B25J 9/162; B25J 9/1664; B25J 5/007
See application file for complete search history.

(56) References Cited

U.S. PATENT DOCUMENTS

2019/0184560 A1* 6/2019 Liu ........................ B25J 9/1605
2023/0072201 A1* 3/2023 Regmi .................. B25J 9/1633

FOREIGN PATENT DOCUMENTS

JP 2023-110178 A 8/2023

OTHER PUBLICATIONS

Yoshikawa, T., "Manipulability of Robotic Mechanisms," Journal of the Robotics Society of Japan, 1984, vol. 2, No. 1, p. 63-67.
Kunz, T., et al., "Time-Optimal Trajectory Generation for Path Following with Bounded Acceleration and Velocity," Robotics: Science and Systems (RSS), 2012.

(Continued)

*Primary Examiner* — Ian Jen
(74) *Attorney, Agent, or Firm* — Dinsmore & Shohl LLP

(57) ABSTRACT

A control system is configured to execute: a parameter optimization processing to optimize a rotational speed of a wheel and an angular velocity of joints of the arm of a mobile robot that have already been calculated; and a temporal trajectory optimization processing to optimize a trajectory of the end effector by performing temporal trajectory optimization. The parameter optimization processing adjusts a weight of a rotational speed of the wheel and a weight of the angular velocity of the joints of the arm so that the weight of the rotational speed of the wheel that is applied to the rotational speed of the wheel increases as the end effector approaches a target position of the end effector, whereby the angular velocity of the joints of the arm is minimized. The control system can employ a machine trained model.

9 Claims, 5 Drawing Sheets

(56)          References Cited

OTHER PUBLICATIONS

Takeshita, K., et al., "Mobile Manipulation System with Cyclic Whole-Body Trajectory Planning," 28th Robotics Symposia, 2023, p. 177-184.

Burgess-Limerick, B., et al., "An Architecture for Reactive Mobile Manipulation On-The-Move," In: IEEE International Conference on Robotics and Automation (ICRA) IEEE, 2023, p. 1623-1629.

* cited by examiner

TEMPORAL TRAJECTORY
ACCORDING TO PRIOR ART

TEMPORAL TRAJECTORY ACCORDING
TO PRESENT DISCLOSURE

| | CONVENTIONAL METHOD | METHOD ACCORDING TO PRESENT DISCLOSURE |
|---|---|---|
| OPERATION SUCCESS RATE (%) | 50 | 70 |
| STABILITY RATE (%) | 20 | 100 |
| AVERAGE OPERATION COMPLETION TIME (SEC) | 11.1 | 11.4 |

CONVENTIONAL METHOD

METHOD ACCORDING TO PRESENT DISCLOSURE

CONTROL SYSTEM, CONTROL METHOD, AND NON-TRANSITORY COMPUTER READABLE MEDIUM STORING CONTROL PROGRAM

CROSS REFERENCE TO RELATED APPLICATIONS

This application is based upon and claims the benefit of priority from Japanese patent application No. 2023-207410, filed on Dec. 8, 2023, the disclosure of which is incorporated herein in its entirety by reference.

BACKGROUND

The present disclosure relates to a control system, a control method, and a control program for controlling mobile robots.

Conventionally, various mobile robots have been proposed. Regarding a technique related to such mobile robots, Patent Literature 1 discloses a trajectory generation apparatus for an omnidirectional mobile body including constraint calculation means for calculating the maximum acceleration of joint parameters on the basis of Jacobi's formula derived based on the current joint state of the mobile body, and trajectory calculation means for calculating a temporal trajectory by performing forward integral and backward integral on the plane of the trajectory parameters s and s (dots) on the basis of an acceleration limit vector including the maximum acceleration of the joint parameters, thereby performing optimization processing.

Patent Literature 1: Japanese Unexamined Patent Application Publication No. 2023-110178
Non-Patent Literature 1: T. Yoshikawa, "Manipulability of Robotic Mechanisms", Journal of the Robotics Society of Japan, Volume 2, No. 1, p 63-67, (1984)
Non-Patent Literature 2: Tobias Kunz and Mike Stilman, "Time-Optimal Trajectory Generation for Path Following with Bounded Acceleration and Velocity", Robotics: Science and Systems, (2012)
Non-Patent Literature 3: Keisuke Takeshita, Takashi Yamamoto: "Mobile Manipulation System with Cyclic Whole-body Trajectory Planning", 28th Robotics Symposia, p 177-184, (2023)

SUMMARY

However, an object of the trajectory generation apparatus disclosed in Patent Literature 1 is to be able to calculate a temporal trajectory at a higher speed, and not enabling a mobile robot to stably hold and position an object-to-be-grasped.

The present disclosure is made to solve the problem mentioned above, an object of the present disclosure is to provide a control system, a control method, and a control program each adapted to enable a mobile robot to stably hold and position an object-to-be-grasped.

An aspect of the present disclosure is a control system for controlling an operation of a mobile robot that includes a wheel for moving the mobile robot, an arm, and an end effector connected to the arm, the control system including:

a parameter optimization processing unit configured to optimize a rotational speed of the wheel and an angular velocity of joints of the arm that have already been calculated; and a temporal trajectory optimization processing unit configured to optimize a trajectory of the end effector by performing temporal trajectory optimization, in which the parameter optimization processing unit adjusts a weight of a rotational speed of the wheel and a weight of the angular velocity of the joints of the arm so that the weight of the rotational speed of the wheel that is applied to the rotational speed of the wheel increases as the end effector approaches a target position of the end effector, whereby the angular velocity of the joints of the arm is minimized.

The parameter optimization processing unit is configured to maximize manipulability of the arm using a Jacobian matrix that acts on the angular velocity of the joints of the arm, and the Jacobian matrix includes: a value w representing manipulability of the arm; a transpose matrix $(J_{arm}H^T)^T$ between a Jacobian matrix $J_{arm}$ and a transpose matrix $H^T$ of a Hessian matrix H, the Jacobian matrix $J_{arm}$ representing a relationship between the velocity of the end effector at the angular velocity of the joints of the arm; and an inverse matrix of the transpose matrix $J_{arm}^T$ between the Jacobian matrix $J_{arm}$ and a transpose matrix of the Jacobian matrix $J_{arm}$.

The target rotational speed of the end effector can be calculated by performing control to fill a deviation between a roll angle, a pitch angle, and a yaw angle that are target orientations of the end effector and a roll angle, a pitch angle, and a yaw angle that are current orientations of the end effector.

Another aspect of the present disclosure is a control method for controlling an operation of a mobile robot that includes a wheel for moving the mobile robot, an arm, and an end effector connected to the arm, the method including causing a computer to execute:

a parameter optimization processing for optimizing a rotational speed of the wheel and an angular velocity of joints of the arm that have been already calculated; and a temporal trajectory optimization processing for optimizing a trajectory of the end effector by performing temporal trajectory optimization, in which the parameter optimization processing includes adjusting a weight of a rotational speed of the wheel and a weight of the angular velocity of the joints of the arm to be applied to the angular velocity of the joints of the arm so that the weight of the rotational speed of the wheel to be applied to the rotational speed of the wheel increases as the end effector approaches a target position of the end effector, whereby the angular velocity of the joints of the arm is minimized.

According to an aspect of the present disclosure, a control program for controlling an operation of a mobile robot that includes a wheel for moving the mobile robot, an arm, and an end effector connected to the arm, is configured to cause a computer to execute:

a parameter optimization processing for optimizing a rotational speed of the wheel and an angular velocity of joints of the arm that have already been calculated; and a temporal trajectory optimization processing for optimizing a trajectory of the end effector by performing temporal trajectory optimization, in which the parameter optimization processing includes adjusting a weight of a rotational speed weight of the wheel and a weight of the angular velocity of the joints of the arm to be applied to the angular velocity of the joints of the arm so that the weight of the rotational speed of the wheel to be applied to the rotational speed of the wheel increases as the end effector approaches a target position of end effector, whereby the angular velocity of the joints of the arm is minimized.

The present disclosure can provide a control system, a control method, and a control program each adapted to enable a mobile robot to stably grasp and position an object-to-be-grasped.

The above and other objects, features and advantages of the present disclosure will become more fully understood from the detailed description given hereinbelow and the accompanying drawings.

DESCRIPTION OF EMBODIMENTS

Figure 1:
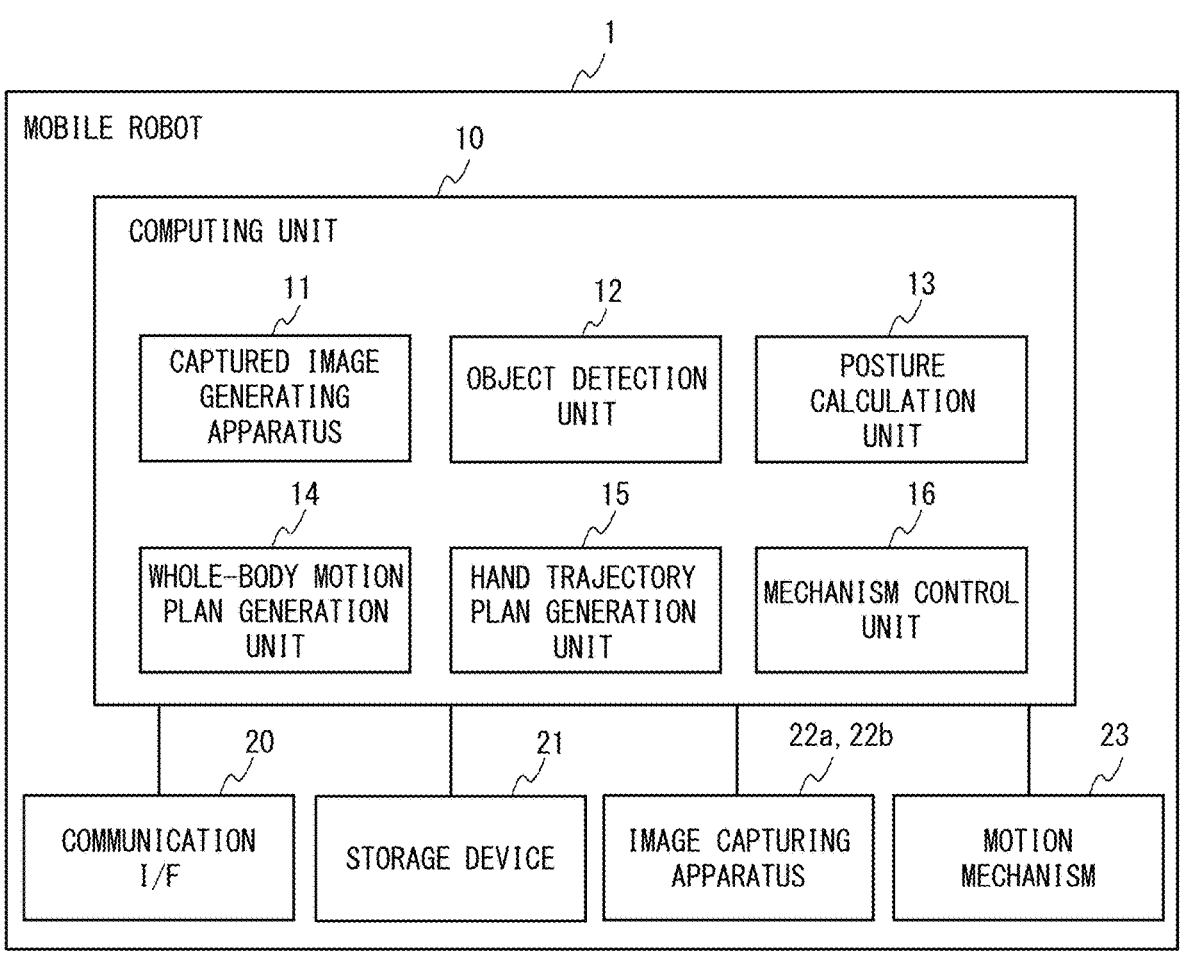
FIG. 1 is a diagram showing a configuration of a mobile robot according to an embodiment.

FIG. 1 is a diagram showing a configuration of a mobile robot 1 according to an embodiment. The mobile robot 1 includes a computing unit 10, a communication interface (I/F) 20, a storage device 21, image capturing apparatuses 22a and 22b, and a motion mechanism 23.

The computing unit 10 is an apparatus configured to perform an overall control of the mobile robot 1. Specific examples of the computing unit 10 include a CPU (Central Processing Unit), an MPU (Micro Processing Unit), an ECU (Electronic Control Unit), and the like. The computing unit 10 corresponds to a computer.

The computing unit 10 implements a control method by executing a control program for controlling the mobile robot 1. A semiconductor device such as an FPGA (Field-Programmable Gate Array) or an ASIC (Application Specific Integrated Circuit) may execute the control program. These semiconductor devices also correspond to computers.

The communication interface (I/F) 20 is a device for communicating data with an external device. The storage device 21 is a storage device for storing various information processed by the computing unit 10.

The image capturing apparatuses 22a and 22b are apparatuses for capturing images of the surroundings of the mobile robot 1. The image capturing apparatus 22a is installed in a head part of the mobile robot 1. The image capturing apparatus 22b is installed in an end effector.

The motion mechanism 23 is a mechanism by which the mobile robot 1 makes a motion. Specifically, the motion mechanism 23 includes a plurality of wheels mounted on a bogie part of the mobile robot 1, an arm connected to the main body part of the mobile robot 1, and an end effector connected to the arm.

The control program executed by the computing unit 10 includes a captured image generating apparatus 11, an object detection unit 12, a posture calculation unit 13, a whole-body motion plan generation unit 14, a hand trajectory plan generation unit 15, and a mechanism control unit 16.

The captured image generating apparatus 11 is a program for generating captured images using the image capturing apparatuses 22a and 22b for capturing images of the surroundings of the mobile robot 1. The image capturing apparatus 22a is installed in the head part of the mobile robot 1. The image capturing apparatus 22b is installed in an end effector. Therefore, the captured image generating apparatus 11 can generate a captured image with the head part of the mobile robot 1 as a base point. Alternatively, the captured image generating apparatus 11 can generate a captured image with the end effector of the mobile robot 1 as a base point.

The object detection unit 12 is a program for detecting an object-to-be-grasped and a placement table on which the object-to-be-grasped is placed by referring to a captured image generated by the captured image generating apparatus 11. For detecting an object-to-be-grasped and the placement table, various image detection methods such as pattern matching can be employed.

The posture calculation unit 13 is a program for calculating the posture of an end effector of the mobile robot 1. The posture of the end effector calculated by the posture calculation unit 13 includes three-dimensional position coordinates and orientation (a roll angle, a pitch angle, and a yaw angle) of the end effector.

The whole-body motion plan generation unit 14 is a program for generating a whole-body motion plan for the mobile robot 1. The whole-body motion plan covers a wheel and an arm included in the mobile robot 1, which are to be operated simultaneously based on the whole-body motion plan. The whole-body motion plan generation unit 14 can generate a whole-body motion plan for the mobile robot 1 based on quadratic programming. In the whole-body motion plan, three-dimensional positional information of the bogie part, the rotational speed of the wheel, the joint angle of the arm, and the angular velocity of the joints of the arm for realizing the target hand position and the target hand speed which are the target position and the target speed of the end effector are calculated. In generating the whole-body motion plan, the whole-body motion plan generation unit 14 optimizes the rotational speed of the wheel and the angular velocity of the joints of the arm which are to be calculated in the whole-body motion plan. The whole-body motion plan generation unit 14 corresponds to the parameter optimization processing unit.

The hand trajectory plan generation unit 15 is a program for generating a hand trajectory plan of the mobile robot 1. The hand trajectory plan is for an end effector of the mobile robot 1. In the hand trajectory plan, the trajectory of the end effector and the target hand position speed that is the target position speed of the end effector are calculated. In generating a hand trajectory plan, the hand trajectory plan generation unit 15 optimizes the trajectory of the end effector calculated in the hand trajectory plan by performing temporal trajectory optimization. The hand trajectory plan generation unit 15 corresponds to a temporal trajectory optimization processing unit.

The mechanism control unit 16 is a program for controlling a wheel, an arm, and an end effector, which are motion mechanisms of the mobile robot 1. The mechanism control unit 16 controls these motion mechanisms based on the whole-body motion plan generated by the whole-body motion plan generation unit 14 and the hand trajectory plan generated by the hand trajectory plan generation unit 15.

Figure 2:
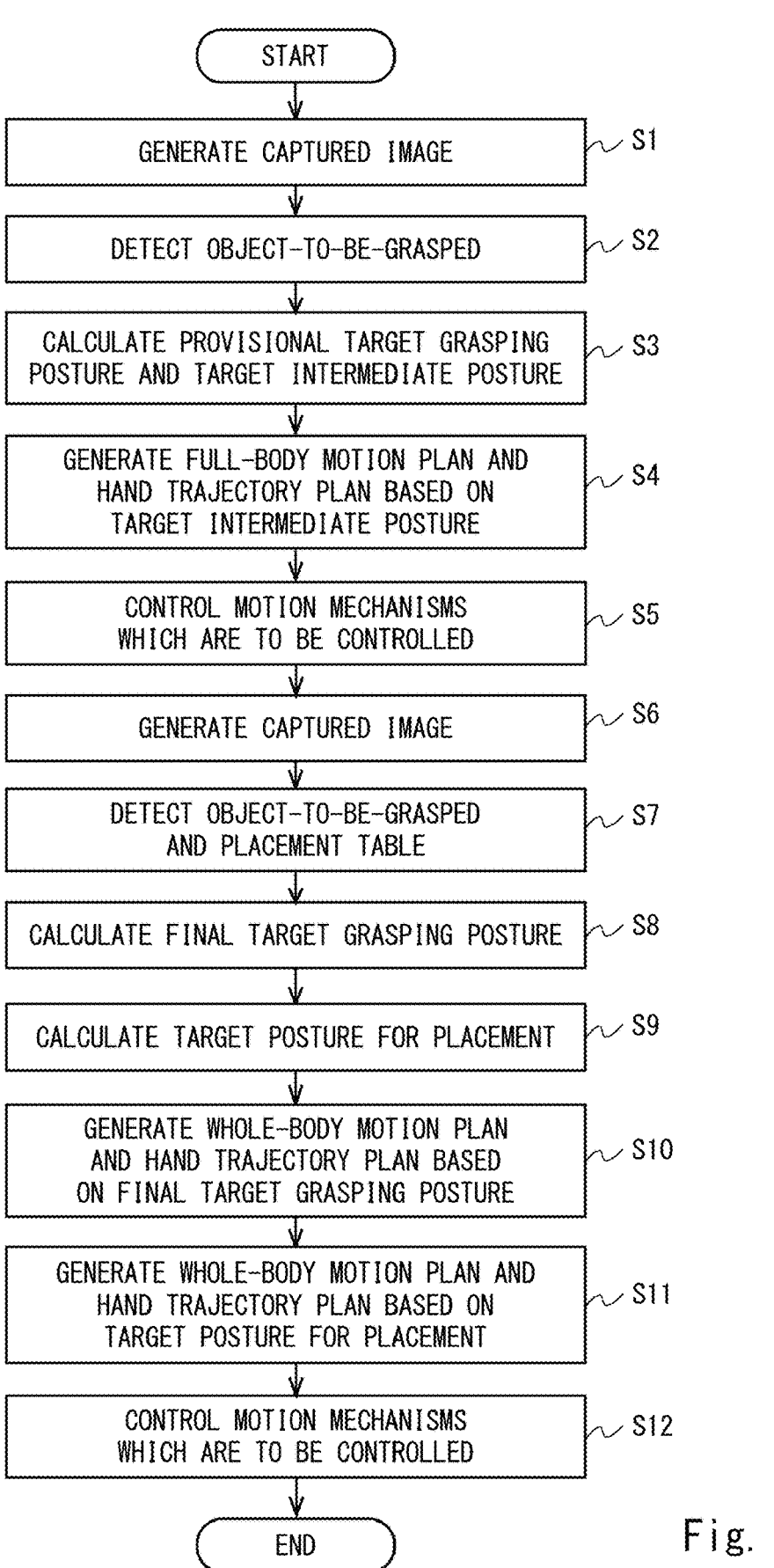
FIG. 2 is a flowchart showing an example of a processing executed by a computing unit of a mobile robot according to an embodiment.

FIG. 2 is a flowchart showing an example of processing executed by the computing unit 10 of the mobile robot 1. In Step S1, the captured image generating apparatus 11 generates a captured image of the surroundings of the mobile robot 1 using the image capturing apparatus 22a installed in the head part of the mobile robot.

In Step S2, the object detection unit 12 detects an object-to-be-grasped by referring to the captured image generated in Step S1.

In Step S3, the posture calculation unit 13 calculates a provisional target grasping posture of an end effector and the target intermediate posture based on the captured image generated in Step S1 and the positional information of the object-to-be-grasped in the captured image detected in Step S2.

Figure 3:
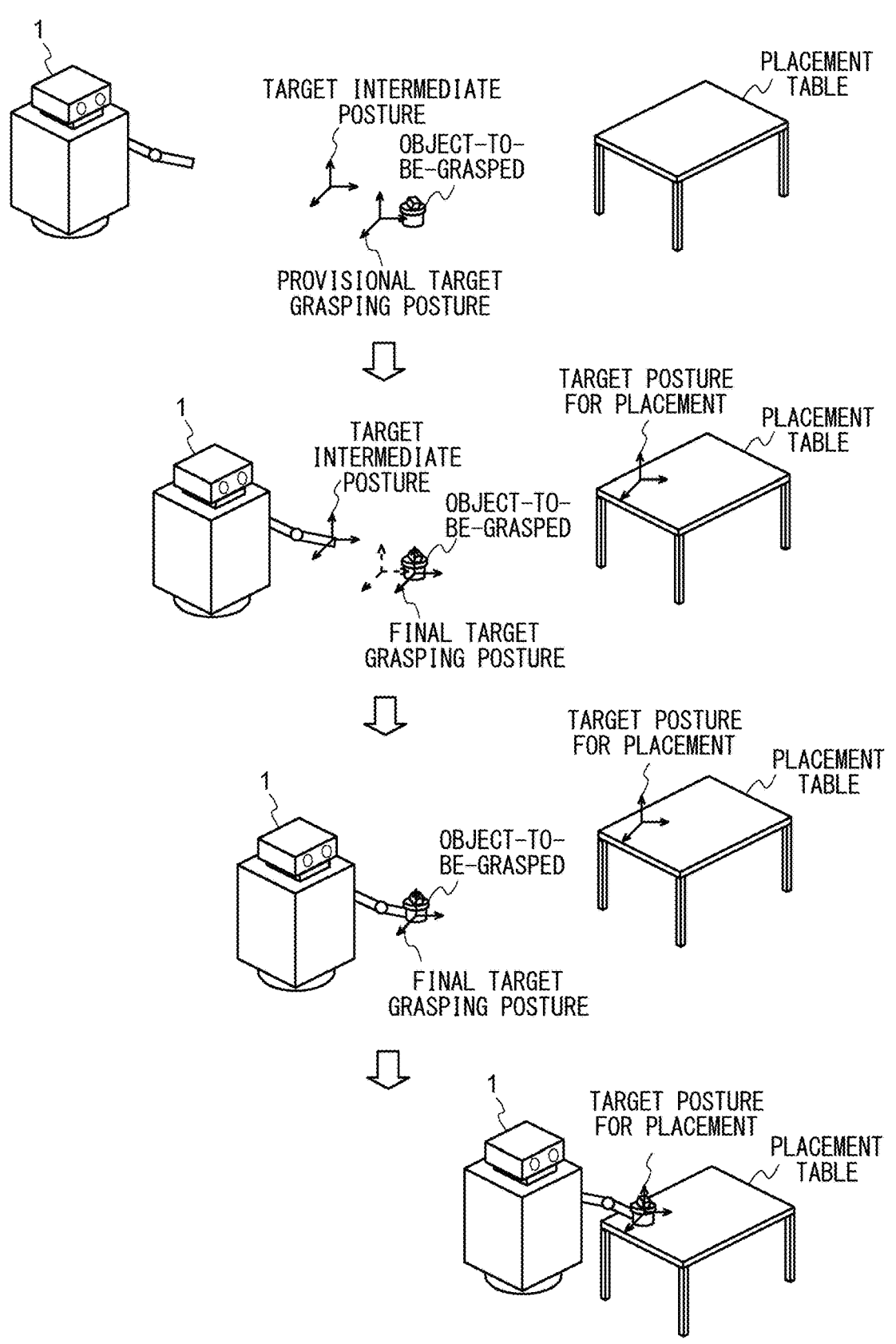
FIG. 3 is a diagram showing an example of a motion of a mobile robot according to an embodiment.

As shown in FIG. 3, a provisional target grasping posture is a tentative posture for the end effector to grasp the object-to-be-grasped. In the present embodiment, as the three-dimensional position coordinates included in the provisional target grasping posture, for example, the position coordinates of the center of the object-to-be-grasped in the captured image detected in Step S2 can be adopted. A predetermined orientation can be adopted for an orientation of the provisional target grasping posture (a roll angle, a pitch angle, and a yaw angle). Note that a provisional target grasping posture may be calculated using a trained model that has been trained by machine learning such as deep learning. In this case, the trained model can be trained using training data in which the captured image and the positional information of the object-to-be-grasped in the captured image serve as input information and the provisional target grasping posture serves as output information.

The target intermediate posture is the posture of the end effector before the position indicated by the provisional target grasping posture, that is, on the mobile robot 1 side. In this embodiment, as the three-dimensional position coordinates included in the target intermediate posture, for example, the position coordinates of a predetermined distance from the three-dimensional position coordinates included in the provisional target grasping posture can be adopted. The orientation (a roll angle, a pitch angle, and a yaw angle) of the target intermediate posture can be a predetermined orientation. The target intermediate posture may be calculated using a trained model trained by machine learning such as deep learning. In this case, the trained model can be trained using training data in which the captured image and the positional information of object-to-be-grasped in the captured image serve as input information and the target intermediate posture serve as output information. The trained model may further be trained using the provisional target grasping posture as the input information.

In Step S4, the whole-body motion plan generation unit 14 and the hand trajectory plan generation unit 15 generate a whole-body motion plan and a hand trajectory plan, respectively, based on the target intermediate posture calculated in Step S2.

In Step S5, the mechanism control unit 16 controls the wheel, the arm, and the end effector, which are the motion mechanisms to be controlled, based on the whole-body motion plan and the hand trajectory plan generated in Step S4. As a result, the posture of the end effector of the mobile robot 1 coincides with the target intermediate posture, as shown in FIG. 3.

In Step S6, the captured image generating apparatus 11 generates a captured image of the surroundings of the mobile robot 1 using the image capturing apparatus 22a and the image capturing apparatus 22b installed in the end effector.

In Step S7, the object detection unit 12 detects an object-to-be-grasped and a placement table on which and the object-to-be-grasped is placed by referring to the captured image generated in Step S6. At this time, the object detection unit 12 detects the object-to-be-grasped by referring to the captured image generated using the image capturing apparatus 22b. The object detection unit 12 detects a placement table by referring to the captured image generated using the image capturing apparatus 22a.

In Step S8, the posture calculation unit 13 calculates the final target grasping posture based on the captured image of the object-to-be-grasped generated using the image capturing apparatus 22b in Step S7 and the positional information of the object-to-be-grasped detected in Step S7. The final target grasping posture is the final posture for the end effector to grasp the object-to-be-grasped, as shown in FIG. 3. In this embodiment, as the three-dimensional positional coordinates included in the final target grasping posture, for example, the positional coordinates of the center of the object-to-be-grasped in the captured image detected in Step S7 can be adopted. As the final target grasping posture orientation (a roll angle, a pitch angle, and a yaw angle), a predetermined orientation can be adopted. Note that a final target grasping posture may be calculated using a trained model that has been trained by machine learning such as deep learning. In this case, the trained model can be trained using training data in which the captured image and the positional information of the object-to-be-grasped in the captured image serve as the input information and the final target grasping posture serve as the output information.

In Step S9, the posture calculation unit 13 calculates the target posture for placement based on the captured image of the object-to-be-grasped generated by using the image capturing apparatus 22a in Step S7 and the positional information of the placement table detected in Step S7. As shown in FIG. 3, the target posture for placement is a posture of the end effector for placing an object-to-be-grasped on the placement table. In this embodiment, as the three-dimensional positional coordinates included in the target posture for placement, for example, the positional coordinates of the predetermined position of the placement table in the captured image detected in Step S7 can be adopted. As the orientation (a roll angle, a pitch angle, and a yaw angle) of the target posture for placement, a predetermined orientation can be adopted. The target posture for placement may be calculated using a trained model that has been trained by machine learning such as deep learning. In this case, the trained model can be trained using training data in which the captured image and the positional information of the placement table in the captured image serve as the input information and the target posture for placement serve as the output information.

In Step S10, the whole-body motion plan generation unit 14 and the hand trajectory plan generation unit 15 generate a whole-body motion plan and a hand trajectory plan, respectively, based on the final target grasping posture calculated in Step S8.

In Step S11, the whole-body motion plan generation unit 14 and the hand trajectory plan generation unit 15 generate a whole-body motion plan and a hand trajectory plan, respectively, based on the target posture for placement calculated in Step S9.

In Step S12, the mechanism control unit 16 controls the wheel, the arm, and the end effector, which are the motion mechanisms to be controlled, based on the whole-body motion plan and the hand trajectory plan generated in Step S10 and the whole-body motion plan and hand trajectory plan generated in Step S11. As a result, as shown in FIG. 3, the posture of the end effector is a posture at which the end effector grasps and places an object-to-be-grasped on the placement table.

The whole-body motion plan generated by the whole-body motion plan generation unit 14 includes a joint angle limitation, an angular velocity of joints limitation, and collision avoidance as basic functions of the whole-body motion plan. Further, as a function of the whole-body motion plan, it may include manipulability maximization, although, in some embodiments, it may be omitted. When the functions of the joint angle limitation, the angular velocity of joints limitation, and collision avoidance are formulated as quadratic programming problems, they can be expressed as Expressions 1 to 5.

[Expression 1]

$$x = \begin{bmatrix} \dot{q}_{base} \\ \dot{q}_{arm} \\ s \end{bmatrix} \tag{1}$$

[Expression 2]

$$\min_x f_0 = \frac{1}{2} x^T Q x + c^T x \tag{2}$$

[Expression 3]

$$\text{s.t. } J_{all} x = v \tag{3}$$

[Expression 4]

$$\begin{bmatrix} A_{rad} \\ A_{ob} \end{bmatrix} x \leq \begin{bmatrix} b_{rad} \\ b_{ob} \end{bmatrix} \tag{4}$$

[Expression 5]

$$x^{min} \leq x \leq x^{max} \tag{5}$$

In Expressions 1 through 5, x denotes the variable to be optimized, and denotes a vector including a rotational speed $q'_{base}$ of the bogie part wheel, an angular velocity of joints $q'_{arm}$ of the arm, and a slack variable s. The degree of freedom of $q'_{base}$ is defined as l , and the degree of freedom of $q'_{arm}$ is defined as h. The slack variable is a variable that relaxes the equality constraint, and the degree of freedom is 6.

Next, Expression 2 will be described. $f_0$ denotes a function that minimizes angular velocity of joints and maximizes manipulability. The first term of the objective function in Expression 2 is a term for minimizing an angular velocity of joints. $x^T$ denotes a transpose matrix composed of the aforementioned x. Q denotes a matrix that adjusts the weight according to which the value of x is minimized, and is defined by Expression 6.

[Expression 6]

$$Q = \begin{bmatrix} \lambda_q & 0_{6 \times 6} \\ 0_{n \times n} & \lambda_s \end{bmatrix} \tag{6}$$

wherein n denotes the sum (1+h) of the degree of freedom l of $q'_{base}$ and the degree of freedom h of $q'_{arm}$. $\lambda_q$ denotes the diagonal matrix of weights according to which the weights of the rotational speed and the angular velocity of joints of the wheel are adjusted, and is defined by Expression 7. $\lambda_s$ denotes the diagonal matrix of weights according to which the ease of minimization of slack variable s is adjusted, and is defined by Expression 8. Similar to the wheel speed, convergence of the target hand position is increased by making it easier to minimize the slack variable s when the target hand position becomes close. The target hand position corresponds to the target position of an end effector.

[Expression 7]

$$\text{diag}(\lambda_q) = \begin{bmatrix} \frac{1}{e} & \dots & , k_{arm} & \dots \end{bmatrix} \tag{7}$$

wherein e denotes the Euclidean distance between the target hand position and the current hand position. The current hand position corresponds to the current position of an end effector. This reciprocal 1/e is then applied to the wheel rotational speed weights. This is because the amount of motion of the arm is increased by increasing the weight of the speed of the wheel near the target hand position. The convergence of the target hand position is higher when the final adjustment is performed by the arm than by the wheel. $k_{arm}$ denotes a weighting constant related to the angular velocity of joints $q'_{arm}$ of the arm.

[Expression 8]

$$\text{diag}(\lambda_s) = \begin{bmatrix} \frac{1}{e} & \dots \end{bmatrix} \tag{8}$$

Therefore, the whole-body motion plan generation unit 14 minimizes the angular velocity of joints of the arm by adjusting *rotational speed weights of the wheel and angular velocity of joints weights of the arm applied to angular velocity of joints of the arm such that rotational speed weights of the wheel applied to the rotational speed of the wheel increase* as the end effector approaches the target position of end effector.

The second term in Expression 2 is a term for maximizing manipulability. $c^T$ denotes transpose matrix of c defined in Expression 9. C is composed of two terms, one related to the range of motion of the end effector which is the hand, and the other related to the maximization of manipulability.

[Expression 9]

$$c = -k_{ye} \theta_{ye} \delta_{n \cdot 6 \times 1} + \begin{bmatrix} 0_{1 \times 1} \\ J_m \\ 0_{6 \times 1} \end{bmatrix} \tag{9}$$

The first term in Expression 9 is for orienting the hand in the direction of movement of the bogie part. $k_{ye}$ denotes an arbitrary constant. $\theta_{ye}$ denotes the deviation of the angle between the hand and the bogie part in the direction of movement. $\delta_{n+6 \times 1}$ denotes a vector of 0 or 1, and acts on the joint connecting the bogie part and the arm. By trying to orient the hand in the direction of movement of the bogie part, the movable range of the hand can be expanded. The second term in Expression 9 is related to maximizing the manipulability, and acts only on angular velocity of joints $q'_{arm}$ of the arm. $J_m$ denotes the manipulability Jacobian matrix of the arm, and is defined by Expression 10.

[Expression 10]

$$J_m = \begin{bmatrix} w(J_{arm}H_1^T)^T (J_{arm}J_{arm}{}^T)^{-1} \\ w(J_{arm}H_2^T)^T (J_{arm}J_{arm}{}^T)^{-1} \\ \vdots \\ w(J_{arm}H_2^T)^T (J_{arm}J_{arm}{}^T)^{-1} \end{bmatrix} \qquad (10)$$

wherein $J_{arm}$ denotes a Jacobian matrix representing the relation of the speed of hand at angular velocity of joints. H denotes a Hessian matrix, which is a matrix that converts the angular velocity of joints to the amount of variation of the arm's manipulability value w with respect to minute time. The manipulability value w is defined by Expression 11. For more details on the value w representing the manipulability, see the disclosure of Non-Patent Literature 1: T. Yoshikawa, "Manipulability of Robotic Mechanisms", Journal of the Robotics Society of Japan, Volume 2, No. 1, p 63-67, (1984).

[Expression 11]

$$\dot{w} = J_m^T \dot{q}_{arm} \qquad (11)$$

wherein $J_m{}^T$ denotes a transpose matrix of $J_m$.

Therefore, the whole-body motion plan generation unit 14 maximizes the manipulability of the arm by using the Jacobian matrix acting on the angular velocity of the joints of the arm. Jacobian matrix includes the value w representing the manipulability of the arm, transpose matrix $(J_{arm}\cdot H^T)^T$ between Jacobian matrix $J_{arm}$ and transpose matrix $H^T$ of Hessian matrix H representing the relationship between the hand velocity (the velocity of end effector) at angular velocity of joints of the arm, and inverse matrix of transpose matrix $J_{arm}{}^T$ between Jacobian matrix $J_{arm}$ and transpose matrix of Jacobian matrix $J_{arm}$.

Expression 3 will now be described. Expression 3 is an equality constraint for controlling the hand velocity. v is the target hand velocity and is defined by Expression 12.

[Expression 12]

$$v = \begin{bmatrix} v_p \\ v_r \end{bmatrix} \qquad (12)$$

wherein $v_p$ denotes the target hand velocity and is calculated by performing temporal trajectory optimization described later. The target hand position speed corresponds to the target position speed of end effector. $v_r$ denotes the target hand rotational speed, which is calculated by performing P control to fill the deviation between the target hand orientation (a roll angle, a pitch angle, and a yaw angle) and the current orientation (a roll angle, a pitch angle, and a yaw angle). The target hand rotational speed corresponds to the target rotational speed of an end effector.

$J_{all}$ is a matrix that combines the Jacobian matrix of the target hand velocity and the whole-body angular velocity of joints seen from the mobile robot coordinate system and the identity matrix, and is defined by Expression 13. The mobile robot coordinate system defines the forward direction of the mobile robot in the x-axis, the lateral direction in the y-axis, and the direction perpendicular to the ground in the z-axis, as shown in FIG. 3.

[Expression 13]

$$J_{all} = \begin{bmatrix} PJ_{base} & \cdots & 0 \\ \vdots & J_{arm} & \vdots \\ 0 & \cdots & I_{6\times6} \end{bmatrix} \qquad (13)$$

wherein $J_{base}$ denotes a Jacobian matrix representing the relation of the speed of the hand (speed of an end effector) and the speed of the bogie part. Identity matrix I denotes a matrix for slack variable s. Since there is no guarantee that there is an angular velocity of joints that can achieve the target hand speed, control is performed to achieve a hand speed close to the target hand speed by relaxing the equality constraint based on the slack variable s. P denotes a matrix for reflecting the change in the speed of the hand due to the rotation of the bogie part, and is defined by Expression 14.

[Expression 14]

$$P = \begin{bmatrix} 0 & 0 & y_{ee} \\ 0 & 0 & x_{ee} \\ 0 & 0 & 1 \end{bmatrix} \qquad (14)$$

Here, $x_{ee}$ and $y_{ee}$ denote the x and y coordinates of the hand as viewed from the mobile robot coordinate system, respectively.

Next, Expression 4 will be described. Expression 4 is an angular velocity of joints limitation and an inequality constraint for collision avoidance. First, the joint angle limitation will be described. $A_{rad}$ in Expression 4 denotes a matrix for applying the joint angle limitation only to the arm for which the joint angle limitation is desired, and is defined by Expression 15. $A_{rad}$ denotes a combination of an identity matrix and a zero matrix. The aforementioned matrix $A_{rad}$ disables the rotational speed and the slack variable wheels.

[Expression 15]

$$J_{all} = \begin{bmatrix} 0_{1\times1} & \cdots & 0 \\ \vdots & I_{h\times h} & \vdots \\ 0 & \cdots & 0_{6\times6} \end{bmatrix} \qquad (15)$$

In Expression 4, $b_{rad}$ denotes matrix which acts as a speed damper to reduce the angular velocity of joints as the angle approaches the joint angle limitation, defined by Expression 16.

[Expression 16]

$$b_{rad} = \begin{bmatrix} 0_{1\times1} \\ \alpha \dfrac{q_{lim} - q_s}{q_i - q_s} \\ \vdots \\ \alpha \dfrac{q_{lim} - q_s}{q_i - q_s} \\ 0_{6\times1} \end{bmatrix} \qquad (16)$$

wherein $q_{lim}$ denotes the maximum and minimum joint angles at which the robot joint is to be moved. $q_i$ denotes the joint angle at which a speed damper is made to act. $q_s$ denotes a stopping distance that the end effector cannot reach, and is intended to stop before reaching the maximum joint angle. This stopping distance is a distance with the surface layer of the obstacle to be avoided from collision as the base point, and any value can be adopted. $\alpha$ denotes a constant for adjusting the strength of the speed damper described in Expression 16, and can take a value from 0 to 1. The smaller the value of $\alpha$, the stronger the limiting effect of the speed damper.

Next, collision avoidance will be described. Similar to the joint angle limitation described above, collision avoidance is performed based on the concept of the speed damper. In this embodiment, a constraint is imposed on the angular velocity of joints so that when the distance between the link of the mobile robot and an obstacle gets close so that the distance cannot get any closer. $A_{ob}$ in Expression 4 is a matrix relating to a constraint to avoid collision with an obstacle, and is defined by Expression 17.

[Expression 17]

$$A_{ob} = \begin{bmatrix} J_{d0} & 0_{6\times6} \\ \vdots & \end{bmatrix} \quad (17)$$

wherein $J_{d0}$ denotes a Jacobian matrix that converts x to the velocity toward the obstacle as seen from the link of the mobile robot. The dimension of this Jacobian matrix is 1 row and n columns. This matrix $A_{ob}$ disables the slack variable.

$B_{ob}$ in Expression 4 denotes matrix functioning as a speed damper, defined by Expression 18.

[Expression 18]

$$b_{ob} = \begin{bmatrix} \beta \dfrac{d_{lim} - d_s}{d_i - d_s} - v_{ob} \\ \vdots \end{bmatrix} \quad (18)$$

wherein $v_{ob}$ denotes the speed towards link of the mobile robot as seen from the obstacle, or 0 if it is a static obstacle. $d_{lim}$ denotes the allowable maximum distance. This maximum distance is the distance at which a speed damper function operates, and is the distance from the link of the mobile robot 1 to the surface layer of the obstacle. A speed damper function operates when the distance between the surface layer of the obstacle and the end effector is equal to or less than the maximum distance. $d_i$ denotes the distance at which the speed damper of Expression 17 is made to act, and is a distance with the mobile robot 1 as the base point. $d_s$ denotes the stopping distance that the end effector cannot reach, and is the distance with the obstacle as the base point. $d_s$ is a distance at which the link of the mobile robot 1 is stopped before reaching the maximum distance. $\beta$ denotes a constant for adjusting the strength of the speed damper described in Expression 17, and can take a value from 0 to 1. The smaller the value of $\beta$, the stronger the limiting effect of the speed damper.

Next, Expression 5 will be described. Expression 5 is angular velocity of joints limitation and an inequality constraint for continuous movement. $x_{min}$ and $x_{max}$ in Expression 5 are defined by Expression 19.

[Expression 19]

$$x^{min,max} = \begin{bmatrix} q_{base}^{min,max} \\ q_{arm}^{min,max} \\ s^{min,max} \end{bmatrix} \quad (19)$$

wherein $q_{base}^{.min}$ denotes the minimum value of the rotational speed of the wheel of the bogie part. $q_{base}^{.max}$ denotes the maximum value of the rotational speed of the wheel of the bogie part. $q_{base}^{.min}$ and $q_{base}^{.max}$ are defined by Expression 20. $q_{arm}^{.min}$ is the minimum value of the angular velocity of joints of the arm. $q_{arm}^{.max}$ denotes the maximum value of the angular velocity of joints of the arm. The values of $g_{arm}^{.min}$ and $g_{arm}^{.max}$ are the values that be realized by the hardware arm. $s^{min}$ denotes the minimum value of slack variable s. $s^{max}$ denotes the maximum value of slack variable s. The values of $s^{min}$ and $s^{max}$ are determined to be realizable values as the speed of the mobile robot 1 in consideration of hardware constraints and the like. For example, slack variable can be set in order from 0, and a value obtained by adding an arbitrary value as a margin to the value of slack variable when the mobile robot 1 is able to grasp and position an object-to-be-grasped can be adopted. However, as for the rotational speed of the wheel, constraints are imposed to realize continuous movement as much as possible. In other words, constraints are imposed so that $v_x$ becomes a value other than 0.

[Expression 20]

$$\dot{q}_{base}^{min,max} = J_{base}^{-1} \begin{bmatrix} v_x & \varepsilon_x \\ k_y e_x & \varepsilon_y \end{bmatrix} \quad (20)$$

wherein $v_x$ denotes the target translational speed during continuous movement of the bogie part. $\varepsilon_x$ denotes a value that acts as a margin and is such that $v_x$ is a value other than 0. $e_y$ denotes the deviation on the y-axis between the target hand position (target position of end effector) and the current hand position (current position of end effector) seen from the center of the bogie part. $\varepsilon_y$ denotes an arbitrary value that functions as a margin. $k_y$ is a constant for reducing the deviation $e_y$.

Therefore, according to Expression 20, the maximum value of the rotational speed of the wheel of the bogie part corresponds to the result obtained by adding the predetermined speed $\varepsilon_x$ to the target translational movement speed during continuous movement of the bogie part and multiplying by inverse matrix of Jacobian matrix $J_{base}$ ($J_{base}^{-1}$). According to Expression 20, the minimum value of the rotational speed of the wheel of the bogie part corresponds to the result obtained by subtracting the predetermined speed $\varepsilon_x$ from the target translational movement speed during continuous movement of the bogie part and multiplying by inverse matrix of Jacobian matrix $J_{base}$ ($J_{base}^{-1}$).

Next, hand trajectory plan will be described. The present disclosure uses an extended temporal trajectory optimization method disclosed in the Non-Patent Literature 2: Tobias Kunz and Mike Stilman, "Time-Optimal Trajectory Generation for Path Following with Bounded Acceleration and Velocity", Robotics: Science and Systems, (2012). First, the method of Kunz et al. will be described.

Figures 4, 5:
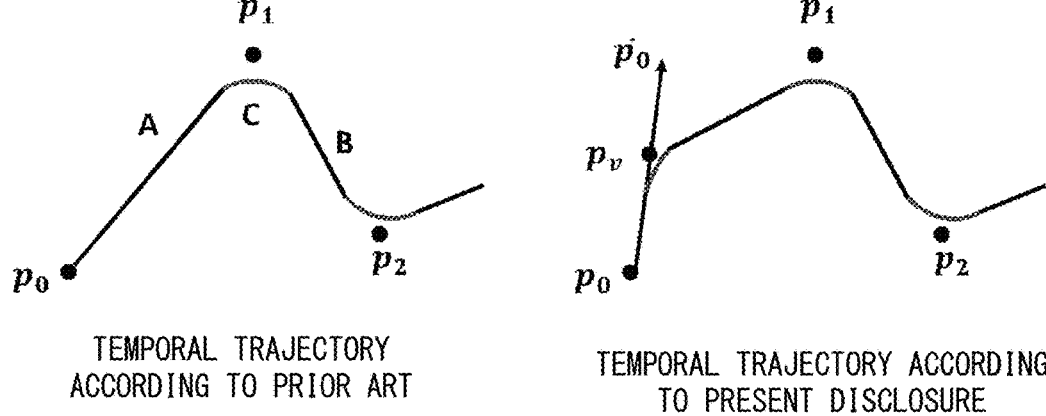
FIG. 4 is a diagram showing a concept of a temporal trajectory optimization processing according to an embodiment.
FIG. 5 is a diagram showing experimental results of grasping and positioning of an object-to-be-grasped.

As shown in FIG. 4, assuming that $p_i$ is the i-th via point of the trajectory, the temporal trajectory optimization processing is as follows.

1. Convert the trajectory into the representation of trajectory length 1 ($0.0 \leq l \leq L$).

(a) Straight segment from $p_0$ to $p_1$ (as indicated by A in the left drawing of FIG. 4).

(b) Straight segment from $p_1$ to $p_2$ (as indicated by B in the left drawing of FIG. 4).

(c) Arc segment continuous with straight segments A and B (as indicated by C in the left drawing of FIG. 4).

(d) . . .

2. Perform forward integral from $(1, 1) = (0.0, 0.0)$. The maximum velocity and acceleration of 1 are derived from the maximum velocity and acceleration of the hand.

3. Perform backward integral from $(1, 1') = (L, 0.0)$ until collision with forward integral.

4. Derive temporal trajectory of the hand from the temporal trajectory of 1.

In the method of Kunz et al., the initial velocity direction is determined by $p_0$ and $p_1$, and we cannot express arbitrary initial velocity. To set arbitrary initial velocity, the following extension was made as disclosed in Non-Patent Literature 3: Keisuke Takeshita, Takashi Yamamoto: "Mobile Manipulation System with Cyclic Whole-body Trajectory Planning", 28th Robotics Symposia, p 177-184, (2023).

1. An appropriate trajectory point $p_v$ in the direction from $p_0$ to $p_{-0}$ is placed between $p_0$ and $p_1$ (right drawing of FIG. 4).

2. $1_{-0}$ in forward integral is set to be the norm of $p_{-0}$.

3. $p_v$ is obtained by a search conditional on forward integral success.

(a) Search for $|p_v - p_0|$ in decreasing order.

(b) The smaller the $|p_v - p_0|$, the shorter the trajectory length (motion time), and so the smaller the $|p_v - p_0|$, the better.

(c) In the case where $|p_v - p_0|$ is too small, forward integral of $p_0$, $p_v$ and $p_1$ will fail.

(d) Since the search will fail at the beginning of forward integral, the impact on total computation time is small.

(e) After forward integral, backward integral is performed in the same way.

Position Feedback Correction

To achieve the target hand speed, the wheel speed and the arm angular velocity of joints are calculated by quadratic programming, but there is no guarantee that there is a solution that can achieve the target hand speed. In the case where there is no solution for achieving the target hand speed, the slack variable value becomes large in order to relax the equality constraint, thereby deviating from the target hand speed. In addition, the actual machine does not always follow the target hand speed. Therefore, the deviation between the calculated target hand position and the current hand position is always fed back, and a control law that reduces the deviation is necessary. Therefore, the target hand speed $v_p$ is calculated as follows.

[Expression 21]

$$v_p = v_{opt} + k_p e_p \qquad (21)$$

wherein $v_{opt}$ denotes the hand speed calculated by performing temporal trajectory optimization, and is a value that changes with time. $k_p$ denotes a constant that adjusts the strength to reduce the deviation between the hand speed calculated by performing temporal trajectory optimization and the current hand position. ep denotes a vector of the deviation in each axis.

Experiment

Experimental Method

In order to verify the effectiveness of the method according to the present disclosure, a pick & place task was performed using a mobile manipulator. A force sensor manufactured by Leptrino Co., Ltd. was attached to the fingertip of a mobile robot, and the gripper was released when the force applied to the fingertip at the time of placing exceeded the threshold value. A three-dimensional range image sensor was installed in a head part and a wrist part of the mobile robot and, and the first recognition was performed using the camera installed in the head part, and the second recognition was performed using the camera installed in the wrist part. A notebook PC was installed in the mobile robot for recognition, and YOLOv8 seg was used for object recognition. A PC for controlling the motion plan and the mobile robot was prepared separately, and the CPU employed was Intel Core i9-12900E. The hand trajectory program was executed in about 3 ms. The whole-body motion program was executed in about 10 ms.

In order to evaluate the method according to the present disclosure, the Pick & Place task was performed ten times each using the method according to the present disclosure and the conventional method. In order to evaluate the effectiveness of the smooth hand trajectory generation, object-to-be-grasped was assumed to be a cup in which multiple cubes were stacked, and it was measured whether the cubes fell from the cup by the action of immediately after grasping. The mobile robot, an object-to-be-grasped, and a table were arranged linearly. The cups were placed at the same place in all experiments.

Experimental Results

FIG. 5 shows the experimental results. Success is defined as the completion of a series of operations until the mobile robot grasps a cup and places it on the desk, and the success rate indicates the percentage of success to the number of times the experiments were carried out. At this time, even when a cube in the cup falls, it is still considered successful, and the ability of the cup itself to accomplish Pick & Place of the cup is evaluated. The results of the success rate of operations show that the success rate was 20% higher when the method according to the present disclosure was adopted than when the conventional method was adopted. In addition, the failed cases of both methods were gripping failures due to misalignment of the gripping position estimation. These results suggest that the method according to the present disclosure reduced the handshake of the mobile robot and improved the estimation accuracy of the gripping position.

In the case where the cube did not fall from the cup due to the movement of immediately after the hand performed grasping, the test was considered successful, and the stability rate indicates the percentage of the experiment that was successful according to the aforementioned definition. The results of the stability rate show that the stability rate was 80% higher when the method according to the present disclosure was adopted than when the conventional method was adopted. From this, it is considered that the smooth hand trajectory enabled stable transportation.

The average operation completion time is the average value of the time taken from the start of operation to the placement of an object-to-be-grasped in the successful case of the operation. When comparing the two methods, there is no prominent difference. Therefore, it can be said that it is possible to perform smooth operation while maintaining quickness by the method according to the present disclosure.

Figure 6:
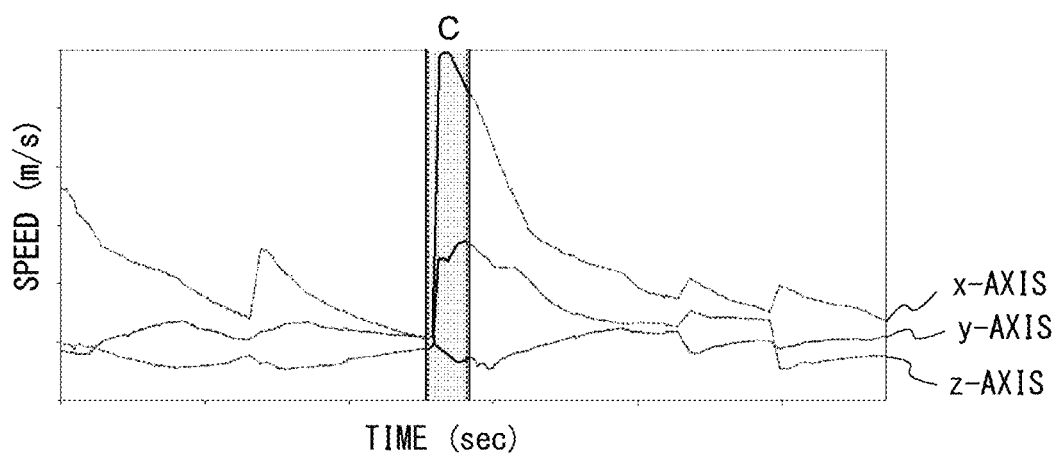
FIG. 6 is a diagram showing an example of a speed command value of a target hand position according to a method of the present disclosure and a conventional method.
Figure 6:
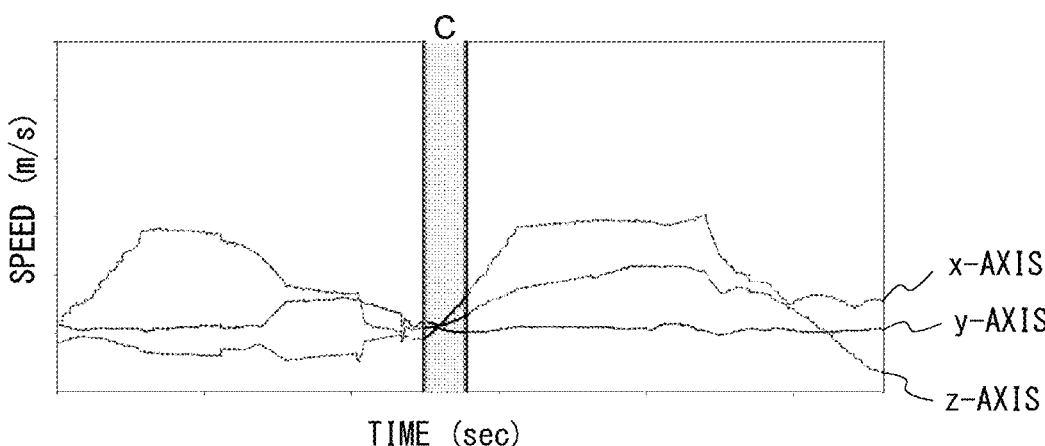

FIG. 6 shows the speed command values of the target hand position at each time by the method according to the present disclosure and the conventional method. The section C in FIG. 6 corresponds to immediately after grasping. Comparing the speed command values of the various methods, it can be understood that the method according to the present disclosure has less rapid speed change overall. Moreover, the section C of immediately after grasping shows that the speed changes rapidly in the conventional method, but smoothly in the method according to the present disclosure. From this, it can be understood that the smooth operation of the end effector was realized in immediately after grasping by performing temporal trajectory optimization described above.

The program includes instructions (or software code) for causing the computer to perform one or more functions described in example embodiment when read into the computer. The program may be stored in a non-transitory computer-readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (registered trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

It should be noted that present disclosure is not limited to the above example embodiments and may be changed as appropriate to the extent that it does not deviate from the gist of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A control system for controlling an operation of a mobile robot that comprises a wheel for moving the mobile robot, an arm, and an end effector connected to the arm, the control system comprising:

at least one memory storing instructions; and
at least one processor executing:
a parameter optimization processing for optimizing a rotational speed of the wheel and an angular velocity of joints of the arm that have been already calculated; and
a temporal trajectory optimization processing for optimizing a trajectory of the end effector by performing temporal trajectory optimization,
wherein the parameter optimization processing includes adjusting a weight of a rotational speed of the wheel and a weight of the angular velocity of the joints of the arm to be applied to the angular velocity of the joints of the arm so that the weight of the rotational speed of the wheel to be applied to the rotational speed of the wheel increases as the end effector approaches a target position of the end effector, whereby the angular velocity of the joints of the arm is minimized.

2. The control system according to claim 1, wherein the parameter optimization processing maximizes manipulability of the arm using a Jacobian matrix that acts on the angular velocity of the joints of the arm, and the Jacobian matrix includes: a value w representing manipulability of the arm; a transpose matrix $(J_{arm}H^T)^T$ between a Jacobian matrix $J_{arm}$ and a transpose matrix $H^T$ of a Hessian matrix H, the Jacobian matrix $J_{arm}$ representing a relationship between the velocity of the end effector at the angular velocity of the joints of the arm; and an inverse matrix of the transpose matrix $J_{arm}^T$ between the Jacobian matrix $J_{arm}$ and a transpose matrix of the Jacobian matrix $J_{arm}$.

3. The control system according to claim 1, wherein the target rotational speed of the end effector is calculated by performing control to fill a deviation between a roll angle, a pitch angle, and a yaw angle that are target orientations of the end effector and a roll angle, a pitch angle, and a yaw angle that are current orientations of the end effector.

4. A control method for controlling an operation of a mobile robot that comprises a wheel for moving the mobile robot, an arm, and an end effector connected to the arm, the method comprising causing a computer to execute:

a parameter optimization processing for optimizing a rotational speed of the wheel and an angular velocity of joints of the arm that have been already calculated; and
a temporal trajectory optimization processing for optimizing a trajectory of the end effector by performing temporal trajectory optimization,
wherein the parameter optimization processing includes adjusting a weight of a rotational speed of the wheel and a weight of the angular velocity of the joints of the arm to be applied to the angular velocity of the joints of the arm so that the weight of the rotational speed of the wheel to be applied to the rotational speed of the wheel increases as the end effector approaches a target position of the end effector, whereby the angular velocity of the joints of the arm is minimized.

5. The control method according to claim 4, wherein
the parameter optimization processing maximizes manipulability of the arm using a Jacobian matrix that acts on the angular velocity of the joints of the arm, and
the Jacobian matrix includes: a value w representing manipulability of the arm; a transpose matrix $(J_{arm}H^T)^T$ between a Jacobian matrix $J_{arm}$ and a transpose matrix $H^T$ of a Hessian matrix H, the Jacobian matrix $J_{arm}$ representing a relationship between the velocity of the end effector at angular velocity of the joints of the arm; and an inverse matrix of the transpose matrix $J_{arm}^T$ between the Jacobian matrix $J_{arm}$ and a transpose matrix of the Jacobian matrix $J_{arm}$.

6. The control method according to claim 4, wherein the target rotational speed of the end effector is calculated by performing control to fill a deviation between a roll angle, a pitch angle, and a yaw angle that are target orientations of the end effector and a roll angle, a pitch angle and a yaw angle that are current orientations of the end effector.

7. A non-transitory computer readable medium storing a control program for controlling an operation of a mobile robot that comprises a wheel for moving the mobile robot, an arm, and an end effector connected to the arm, the control program configured to cause a computer to execute:

a parameter optimization processing for optimizing a rotational speed of the wheel and an angular velocity of joints of the arm that have already been calculated; and
a temporal trajectory optimization processing for optimizing a trajectory of the end effector by performing temporal trajectory optimization,
wherein the parameter optimization processing includes adjusting a weight of a rotational speed weight of the wheel and a weight of the angular velocity of the joints of the arm to be applied to the angular velocity of the joints of the arm so that the weight of the rotational speed of the wheel to be applied to the rotational speed of the wheel increases as the end effector approaches a target position of end effector, whereby the angular velocity of the joints of the arm is minimized.

8. The non-transitory computer readable medium according to claim 7, wherein the parameter optimization processing maximizes manipulability of the arm using a Jacobian matrix that acts on the angular velocity of the joints of the arm, and the Jacobian matrix includes: a value w representing manipulability of the arm; a transpose matrix $(J_{arm}H^T)^T$ between a Jacobian matrix $J_{arm}$ and a transpose matrix $H^T$ of a Hessian matrix H, the Jacobian matrix $J_{arm}$ representing a relationship between the velocity of the end effector at the angular velocity of the joints of the arm; and an inverse matrix of the transpose matrix $J_{arm}{}^T$ between the Jacobian matrix $J_{arm}$ and a transpose matrix of the Jacobian matrix $J_{arm}$.

9. The non-transitory computer readable medium according to claim 7, wherein the target rotational speed of the end effector is calculated by performing control to fill a deviation between a roll angle, a pitch angle, and a yaw angle that are target orientations of the end effector and a roll angle, a pitch angle, and a yaw angle that are current orientations of the end effector.

\* \* \* \* \*